United States Patent
Hoshina

(10) Patent No.: US 9,831,749 B2
(45) Date of Patent: Nov. 28, 2017

(54) STATOR OF ROTARY ELECTRIC MACHINE

(71) Applicant: Toyota Jidosha Kabushiki Kaisha, Toyota-shi Aichi-ken (JP)

(72) Inventor: Hiroshi Hoshina, Toyota Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 308 days.

(21) Appl. No.: 14/864,113

(22) Filed: Sep. 24, 2015

(65) Prior Publication Data
US 2016/0094102 A1   Mar. 31, 2016

(30) Foreign Application Priority Data

Sep. 30, 2014 (JP) .................................. 2014-199783

(51) Int. Cl.
| H02K 11/25 | (2016.01) |
| H02K 3/28 | (2006.01) |
| H02K 11/00 | (2016.01) |
| H02K 3/34 | (2006.01) |

(52) U.S. Cl.
CPC .............. *H02K 11/25* (2016.01); *H02K 3/28* (2013.01); *H02K 3/34* (2013.01); *H02K 11/0047* (2013.01); *H02K 2213/03* (2013.01)

(58) Field of Classification Search
CPC ........ H02K 3/28; H02K 11/0047; H02K 3/34; H02K 11/25; H02K 2213/03
See application file for complete search history.

(56) References Cited

U.S. PATENT DOCUMENTS

| 2001/0011854 A1* | 8/2001 | Heyden | H02K 3/522 310/254.1 |
| 2002/0047425 A1* | 4/2002 | Coupart | B66D 1/12 310/156.01 |
| 2009/0140614 A1* | 6/2009 | Heim | H02K 11/25 310/68 C |
| 2014/0191629 A1* | 7/2014 | Takahashi | H02K 11/0047 310/68 C |
| 2016/0006314 A1* | 1/2016 | Kaneshige | H02K 3/12 310/71 |

FOREIGN PATENT DOCUMENTS

| CN | 202524245 U | 11/2012 |
| JP | 2010-141962 A | 6/2010 |
| JP | 2011-254628 A | 12/2011 |

* cited by examiner

*Primary Examiner* — Mohamad Musleh
(74) *Attorney, Agent, or Firm* — Dinsmore & Shohl LLP

(57) ABSTRACT

A stator of a three-phase driving type rotary electric machine has phase coils wound around teeth of a stator core. In a specific slot among a plurality of slots of the stator core in which one phase coil directly connected to a power terminal and another phase coil directly connected to a neutral point are adjacently disposed, an inter-phase distance ensuring member is disposed in a gap via which the two phase coils are adjacent, and a temperature sensor is inserted into an insertion hole provided in the inter-phase distance ensuring member.

3 Claims, 2 Drawing Sheets

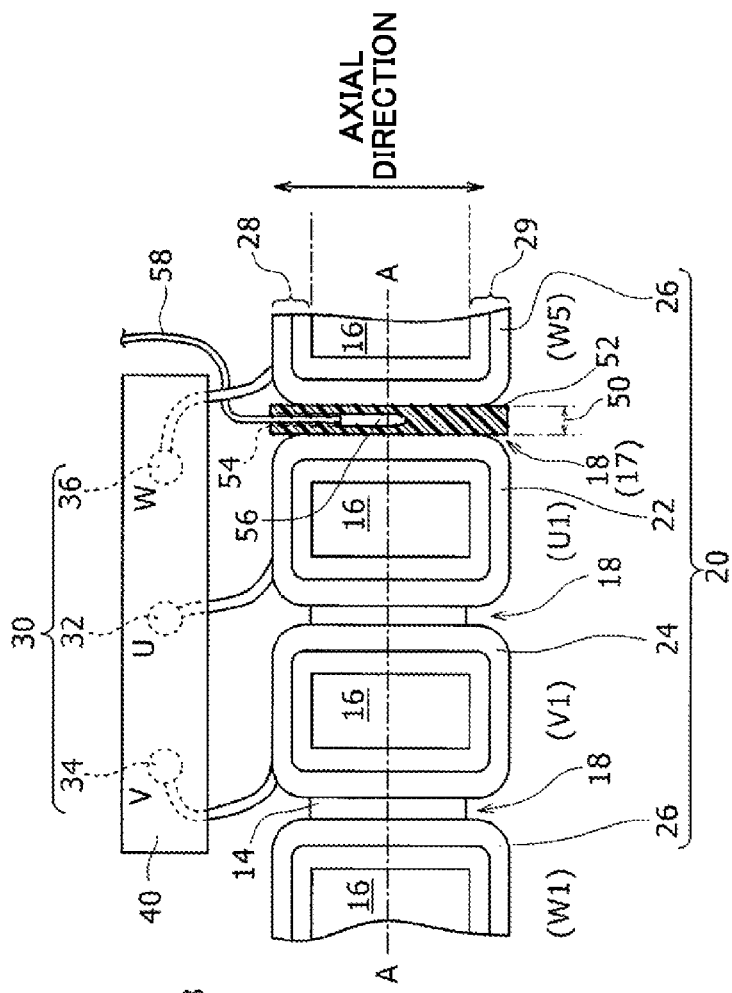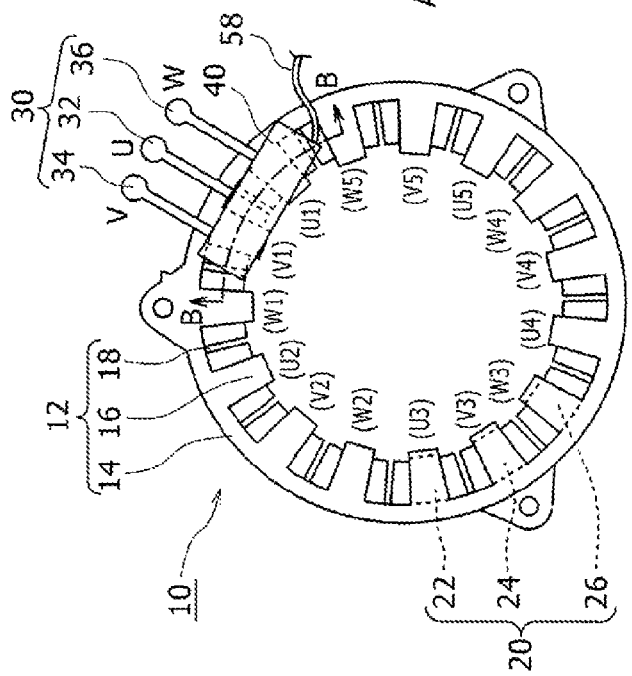

STATOR OF ROTARY ELECTRIC MACHINE

INCORPORATION BY REFERENCE

The disclosure of Japanese Patent Application No. 2014-199783 filed on Sep. 30, 2014 including the specification, drawings and abstract is incorporated herein by reference in its entirety.

BACKGROUND OF THE INVENTION

1. Field of the Invention

The invention relates to a stator of a rotary electric machine, and in particularly, to a stator of a rotary electric machine in one of slots of which coils of different phases are adjacently disposed.

2. Description of Related Art

Coils are provided with a stator of a rotary electric machine. An insulation coating film is provided on the coils, nevertheless if the insulation coating film is thermally degraded, the insulation will be easily damaged. Therefore, a temperature sensor is used in order to detect the temperature of the stator coil.

For example, in Japanese Patent Application Publication No. 2011-254628 (JP 2011-254628A), it is disclosed for a structure for attaching the temperature sensor to the stator coil that, for example, a U-shaped temperature sensor support with two legs is provided in such a manner as to cross over the coils wound via an insulator in a split core. Here, the temperature sensor is inserted into a leg at one side of the temperature sensor support, and the wall of this leg, which is close to the coil, is provided with an opening to detect temperature.

In Japanese Patent Application Publication No. 2010-141962 (JP 2010-141962A), as a structure for preventing the temperature sensor mounted on the stator of the rotary electric machine from misaligning, it is disclosed that, for example, one of U-phase coil, V-phase coil, and W-phase coil is wound around the respective split cores, and the temperature sensor is engaged with one of connecting lines for connecting coils of the same phase disposed in a circumferential direction. For example, when the temperature sensor is engaged with the W-phase connecting line, it is configured so that the front of the temperature sensor reaches above the stator's radially central part of a gap between the U-phase coil and the V-phase coil adjacent thereto.

In a stator of a three-phase driving type rotary electric machine, there is a case where coils of different phases are adjacently disposed in one of slots of the stator. If the potential difference between the coils of different phases, i.e. the inter-phase potential difference, is high, there will be the case where the insulation coating films of the coils are damaged. In particular, if the coils are exposed to high temperature to be thermally degraded, damage to insulation of the coils easily occurs between the coils having high inter-phase potential difference. Therefore, in a slot in which two coils having high inter-phase potential difference are disposed, it is desirable to prevent the insulation damage and to detect the temperature of the coils in the slot.

SUMMARY OF THE INVENTION

An object of the invention is to provide a stator of a rotary electric machine, which is capable of preventing damage to insulation of the coils in a slot in which two coils having the highest inter-phase potential difference are disposed and is capable of detecting the temperature of the coils in the slot in which two coils having the highest inter-phase potential difference are disposed.

A stator of a rotary electric machine according to one aspect of the invention includes: a stator core that includes an annular-shaped back yoke, a plurality of teeth protruded towards an inner peripheral side from the back yoke and arranged along an inner peripheral surface, and a plurality of slots as spaces between adjacent teeth; phase coils that consist of a plurality of U-phase coils, a plurality of V-phase coils and a plurality of W-phase coils that are wound around the teeth of the stator core, a plurality of coils of the same phase being connected with each other in series, one end of the serially connected coils being connected to a power terminal of the same phase, while the other end of the serially connected coils being connected with the other ends of serially connected coils of other phases to form a neutral point; an inter-phase distance ensuring member that, in a slot among the plurality of slots in which one phase coil directly connected to the power terminal and another phase coil directly connected to the neutral point are adjacently disposed, is disposed in a gap via which the two phase coils are adjacent; and a temperature sensor that is inserted in an insertion hole provided in the inter-phase distance ensuring member.

In the stator of the rotary electric machine according to the above aspect, the insertion hole may be provided in the inter-phase distance ensuring member in an axial direction of the stator from the side of a coil end of the stator of the rotary electric machine, and the temperature sensor may be fixed in the insertion hole of the inter-phase distance ensuring member.

In the stator of the rotary electric machine as constructed above, the phase coils of three phases are wound around the teeth of the stator core, and the inter-phase distance ensuring member is provided such that the inter-phase distance ensuring member, in a slot among the plurality of slots in which one phase coil directly connected to the power terminal and another phase coil directly connected to the neutral point are adjacently disposed, is disposed in a gap via which the two coils are adjacent. The inter-phase potential difference between the one phase coil directly connected to the power terminal and the another phase coil directly connected to the neutral point assumes the maximum value among the phase coils of three phases. The inter-phase distance ensuring member is disposed between the one phase coil and the another phase coil, so that damage to insulation of the coils can be effectively prevented.

In addition, in the stator of the rotary electric machine, the temperature sensor is inserted in the insertion hole provided in the inter-phase distance ensuring member, thus it is possible to detect the coil temperature in the slot in which the two coils having the highest inter-phase potential difference are disposed.

In addition, in the stator of the rotary electric machine, the insertion hole is provided in the inter-phase distance ensuring member in the axial direction of the stator from the side of a coil end of the stator of the rotary electric machine, and the temperature sensor is fixed in the insertion hole of the inter-phase distance ensuring member. That is to say, the inter-phase distance ensuring member also functions as a temperature sensor retaining member, and thus the construction becomes simplified.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A is a view showing a section of the stator of the rotary electric machine of an embodiment of the invention, taken approximately at an axially central position with the terminal block superposed thereon.

FIG. 1B is a schematic sectional view taken along the B-B line in FIG. 1A.

DETAILED DESCRIPTION OF EMBODIMENTS

Figure 2:
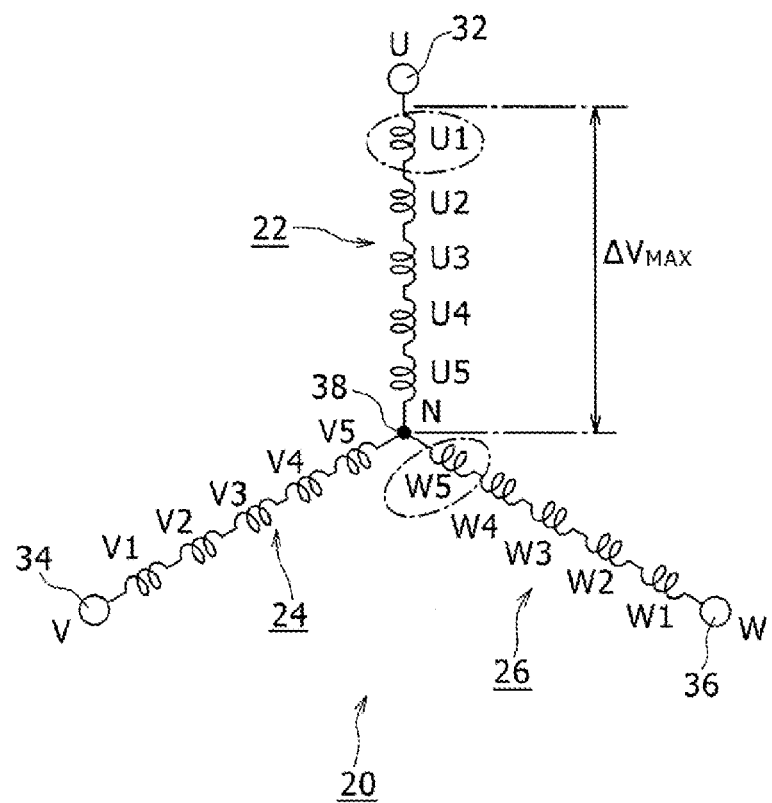
FIG. 2 is a view showing the connection of the respective phase coils of the three phases wound around the stator of the rotary electric machine in FIG. 1A.

Hereinafter, embodiments of the invention will be described in detail by using the accompanying drawings. A stator of a rotary electric machine mounted on a vehicle will be described below, but this is merely an example for descriptive illustration, and it can also be used in other applications than being mounted on a vehicle. The number of teeth, the number of slots, the number of turns of the coils, and so on, as described below, are only presented for descriptive illustration, and can be varied as appropriate according to the specifications of the stator of the rotary electric machine. Hereinafter, like elements will be denoted by like reference characters throughout the drawings, and redundant descriptions thereof will be omitted.

FIG. 1A and FIG. 1B is a structural diagram of a stator 10 of a rotary electric machine. Below, the stator 10 of the rotary electric machine will be referred to as "stator 10" unless otherwise specified. FIG. 1A is a view showing a section of the stator 10 taken approximately at an axially central position with the arrangement of a terminal block 40 superposed thereon, and FIG. 1B is a schematic sectional view taken along the B-B line in FIG. 1A. In FIG. 1B, the axial direction of the stator 10 is shown. In addition, FIG. 1A corresponds to the section taken along the A-A line in FIG. 1B.

The stator 10 is constructed to include a stator core 12 and phase coils 20 wound around the stator core 12. The rotary electric machine is a vehicle-mounted motor generator which functions as an electric motor when the vehicle is powered and functions as a generator when the vehicle is braking, and is a three-phase rotary electric machine. The rotary electric machine is constructed by the stator 10 and a rotor disposed at the inner peripheral side of, and separated by a predetermined gap from, the stator 10.

The stator core 12 is an annular magnetic member, and is constructed to include a base part 14 (a back yoke) at the outer peripheral side, a plurality of teeth 16 protruded radially inward from the base part 14, and a plurality of slots 18 as the spaces between adjacent teeth 16. The stator core 12 is a member formed by stacking a plurality of annular-shaped magnetic thin plates which include the teeth 16 and the slots 18 to be formed in a predetermined shape. As the magnetic thin plates, the electromagnetic steel plates may be used. Instead of the stacked body of the magnetic thin plates, a member formed by integrally forming magnetic powder into a predetermined shape may also be used.

In the three-phase rotary electric machine, the phase coils 20 consist of U-phase coils 22, V-phase coils 24, and W-phase coils 26. The number of the teeth 16 in the stator core 12 is a multiple of 3, and in the example in FIG. 1A, the number of the teeth 16 is 15. In this case, there are five teeth 16 around which the U-phase coils 22 are wound, five teeth 16 around which the V-phase coils 24 are wound, and five teeth 16 around which the W-phase coils 26 are wound. For the winding methods of the phase coils 20, there are distributed winding and centralized winding, and here, the centralized winding in which only the coils of one phase are wound around one tooth 16 is used. Only the one phase coil is wound around one tooth 16 in FIG. 1A, and the adjacent coils 20 which are same phase each other, are connected by connecting lines (not shown).

The phase coils 20 are wound around the teeth 16 by inserting through the slots 18. The phase coils 20 wound around the teeth 16 are protruded out from an axial end of the stator core 12 to form coil ends 28, 29. Although not shown in FIG. 1A and FIG. 1B, in the slots 18, insulators 19 (see FIG. 3) are disposed between the teeth 16 and the phase coils 20.

The phase coils 20 are formed of conductive wires with insulation coating film. As the wire material for the conductive wire with insulation coating film, copper wire, copper-tin alloy wire, silver plated copper-tin alloy wire, and so on may be used. As the insulation coating film, enamel coating film of polyamideimide, polyesterimide, polyimide, polyester, methanal, and so on may be used.

In FIG. 1A, the five teeth 16 around which the U-phase coils 22 are wound are respectively denoted by the reference characters (U1), (U2), (U3), (U4), and (U5). The reference characters of the teeth 16 are provided with parentheses, and hereinafter, the U-phase coils 22 wound around the five teeth 16 are respectively referred to as U1, U2, U3, U4, and U5, so as to distinguish the U-phase coils 22 from the teeth 16 around which the U-phase coils 22 are wound. Similarly, the five teeth 16 around which the V-phase coils 24 are wound are respectively denoted by the reference characters (V1), (V2), (V3), (V4), and (V5), and the five teeth 16 around which the W-phase coils 26 are wound are respectively denoted by the reference characters (W1), (W2), (W3), (W4), and (W5).

Among the fifteen teeth 16 in the circumferential direction of the stator core 12, the five teeth 16 around which the U-phase coils 22 are wound are provided at intervals of two teeth. Similarly, the five teeth 16 around which the V-phase coils 24 are wound and the five teeth 16 around which the W-phase coils 26 are wound are also provided at intervals of two teeth, respectively, among the fifteen teeth 16 in the circumferential direction of the stator core 12.

FIG. 2 is a diagram showing connection of the fifteen coils, that is, U1~U5, V1~V5, and W1~W5 in the phase coils 20, which are respectively wound around the fifteen teeth 16. As shown in FIG. 2, the five coils of the same phase are connected with each other in series, and one end of the serially connected coils is connected to a power terminal of the same phase, while the other end of the serially connected coils is connected with the other ends of the serially connected coils of other phases to form a neutral point N.

For example, among the U-phase coils 22, the coils U1 to U5 are connected in series, and one end of the coil U1 which is at one end of the serially connected coils is connected to a power terminal 32 of U phase, while the other end of the coil U5 which is at the other end of the serially connected coils is connected to a neutral point 38. Similarly, among the V-phase coils 24, the coils V1 to V5 are connected in series, and one end of the coil V1 which is at one end of the serially connected coils is connected to a power terminal 34 of V phase, while the other end of the coil V5 which is at the other end of the serially connected coils is connected to the neutral point 38. Among the W-phase coils 26, the coils W1 to W5 are connected in series, and one end of the coil W1 at one end of the serially connected coils is connected to a power terminal 36 of W phase, while the other end of the coil W5 at the other end of the serially connected coils is connected to the neutral point 38.

Returning to FIG. 1B, three power terminals 30 of the power terminals 32, 34, and 36 are pulled out from the coil end 28, and are connected to external control circuits (not shown) or the like via the terminal block 40.

In each of the fifteen slots 18, coils of different phases are adjacently disposed. For example, in FIG. 1B, in the slot 18 between the tooth 16 of (W5) and the tooth 16 of (U1), the W-phase coil W5 and the U-phase coil U1 are adjacently disposed. Similarly, in the slot 18 between the tooth 16 of (U1) and the tooth 16 of (V1), the U-phase coil U1 and the V-phase coil V1 are adjacently disposed, and in the slot 18 between the tooth 16 of (V1) and the tooth 16 of (W1), the V-phase coil V1 and the W-phase coil W1 are adjacently disposed.

When coils of different phases are adjacently disposed in one slot 18, inter-phase potential difference will be generated between the adjacent coils. In the example in FIG. 1B, in the slot 18 between the tooth 16 of (W5) and the tooth 16 of (U1), inter-phase potential difference is generated between the W-phase coil W5 and the U-phase coil U1; in the slot 18 between the tooth 16 of (U1) and the tooth 16 of (V1), inter-phase potential difference is generated between the U-phase coil U1 and the V-phase coil V1; and in the slot 18 between the tooth 16 of (V1) and the tooth 16 of (W1), inter-phase potential difference is generated between the V-phase coil V1 and the W-phase coil W1.

Referring to FIG. 2, the three inter-phase potential differences are compared; the inter-phase potential difference between the W-phase coil W5 and the U-phase coil U1 is the potential difference between the power terminal 32 of U phase and the neutral point 38, and therefore becomes the maximum value $\Delta V_{MAX}$ of inter-phase potential difference. In addition, theoretically, the slot 18 capable of generating the maximum value $\Delta V_{MAX}$ is the slot 18 in which the V-phase coil V1 connected to the power terminal 34 of V phase and the U-phase coil U5 or the W-phase coil W5 connected to the neutral point 38 are adjacently disposed, and the slot 18 in which the W-phase coil W1 connected to the power terminal 36 of W phase and the U-phase coil U5 or the V-phase coil V5 connected to the neutral point 38 are adjacently disposed. However, the two slots 18 with such possibilities do not exist in the fifteen slots 18 shown in FIG. 1A. Therefore, the slot 18 in which the W-phase coil W5 and the U-phase coil U1 are adjacently disposed is the only slot 18 capable of generating the maximum value $\Delta V_{MAX}$ of inter-phase potential difference. Therefore, in order to differentiate the only slot 18 generating the maximum value $\Delta V_{MAX}$ of inter-phase potential difference from the other fourteen slots 18, this slot is referred to as specific slot 17.

Figure 3:
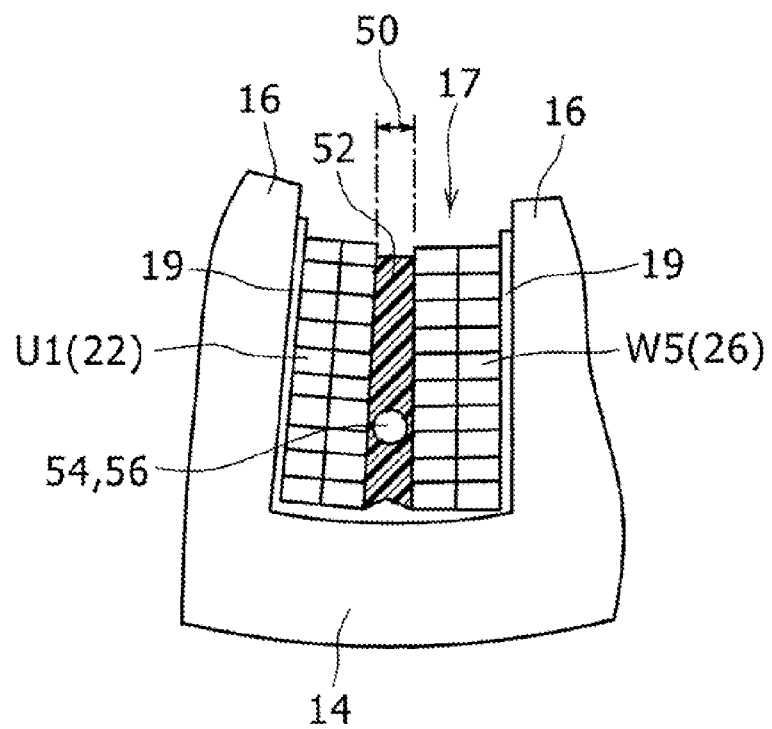
FIG. 3 is a sectional view showing the slot in which the temperature sensor is disposed in FIG. 1A.

In the specific slot 17, a member for ensuring an inter-phase distance is disposed in a gap via which one coil and another phase coil generating the maximum value $\Delta V_{MAX}$ of inter-phase potential difference are adjacent. In the example in FIG. 1B, in the gap 50 via which the W-phase coil W5 and the U-phase coil U1 generating the maximum value $\Delta V_{MAX}$ of inter-phase potential difference are adjacent, an inter-phase distance ensuring member 52 is disposed. FIG. 3 is a schematic sectional view taken along the A-A line in the specific slot 17.

The inter-phase distance ensuring member 52 is disposed in the axial direction of the stator 10 over the entire length between an upper face of the coil end 28 at one side and a lower face of the coil end 29 at the other side. In the radial direction of the stator 10, it is disposed over the entire length in which the W-phase coil W5 and the U-phase coil U1 are wound around the tooth 16 radially. In the example in FIG. 3, the W-phase coil W5 and the U-phase coil U1 are respectively wound in ten segments in the radial direction of the tooth 16, and wound in two layers in the circumferential direction, so that the inter-phase distance ensuring member 52 is disposed over the entire length between the upper face of the coil end 28 at one side and the lower face of the coil end 29 at the other side in such a manner as to contact the outer peripheral coil of the two wound layers of the W-phase coil W5 and the outer peripheral coil of the two wound layers of the U-phase coil U1. In the radial direction, as shown in FIG. 3, the inter-phase distance ensuring member is disposed in such a manner that at least part thereof contacts all the ten segments of coils.

The inter-phase distance ensuring member 52 employs a member obtained by forming electrically insulative material to have a predetermined thickness. As the material, epoxy-based resin and polysiloxane-based resin may be used. The predetermined thickness may be determined based on the insulation and pressure-resistance specifications of the stator 10. In addition, for example, if only resin in liquid state is dropped into the gap 50 generated after the W-phase coil W5 and the U-phase coil U1 are respectively wound around the teeth 16 to be cured, the inter-phase distance would not become constant, and is not enough to ensure a predetermined inter-phase distance between the W-phase coil W5 and the U-phase coil U1. However, after the inter-phase distance ensuring member 52 is disposed in the gap 50, in order to fix it in the gap 50, resin in liquid state is dropped and cured, this is preferable as fixing means.

In this way, by disposing the inter-phase distance ensuring member 52 between the coils generating the maximum value $\Delta V_{MAX}$ of inter-phase potential difference, it is possible to effectively prevent damage to the coils in the stator 10.

Insertion hole 54 is a hole which is provided in the inter-phase distance ensuring member 52 for inserting a temperature sensor 56. The insertion hole 54 extends from the upper face side of the coil end 28 at one side of the stator 10 in the axial direction of the stator 10 to have a hole depth which is about ½ of the axial length of the inter-phase distance ensuring member 52.

The temperature sensor 56 is a coil temperature detecting unit for detecting the temperature of the W-phase coil W5 and the U-phase coil U1 generating the maximum value $\Delta V_{MAX}$ of inter-phase potential difference. The temperature sensor 56 is disposed in the insertion hole 54 provided in the inter-phase distance ensuring member 52.

As the temperature sensor 56, a thermistor may be used. The temperature detected by the temperature sensor 56 is sent to control circuits (not shown) etc. via a signal line 58 pulled out from the thermistor. The temperature sensor 56 and the signal line 58 are fixed in the insertion hole 54 of the inter-phase distance ensuring member 52. As fixing means, the inner diameter of the insertion hole 54 is set to be slightly smaller than the outer diameter of the temperature sensor 56, so that the temperature sensor 56 is pressed into the insertion hole 54 to be fixed by the engagement force. Alternatively, the temperature sensor 56 with the signal line 58 may be fixed in the insertion hole 54 by injecting resin adhesive or the like into the insertion hole 54 after the temperature sensor 56 with the signal line 58 is inserted therein.

If the temperature of the coil is high, the insulation coating film of the coil is thermally degraded easily, and thus the insulation is damaged. If the thermally degraded coil is a coil generating the maximum value $\Delta V_{MAX}$ of inter-phase potential difference, the possibility of damage to insulation of the insulation coating film becomes further higher. By providing the temperature sensor 56 in the inter-phase distance ensuring member 52, it is possible to detect the coil temperature of the coils generating the maximum value $\Delta V_{MAX}$ of inter-phase potential difference, and thus it is possible to effectively prevent insulation damage to coils in the stator 10. The inter-phase distance ensuring member 52 functions both to ensure a distance between the W-phase coil W5 and the U-phase coil U1 generating the maximum value $\Delta V_{MAX}$ of inter-phase potential difference and to retain the temperature sensor 56, thus it is not necessary to provide a special disposing member for disposing the temperature sensor 56 between the W-phase coil W5 and the U-phase coil U1 generating the maximum value $\Delta V_{MAX}$ of inter-phase potential difference.

What is claimed is:

1. A stator of a rotary electric machine, comprising:
    a stator core that includes an annular-shaped back yoke, a plurality of teeth protruded towards an inner peripheral side from the back yoke and arranged along an inner peripheral surface, and a plurality of slots as spaces between adjacent teeth;
    phase coils that consist of a plurality of U-phase coils, a plurality of V-phase coils and a plurality of W-phase coils that are wound around the teeth of the stator core, a plurality of coils of the same phase being connected with each other in series, one end of the serially connected coils being connected to a power terminal of the same phase, while the other end of the serially connected coils being connected with the other ends of serially connected coils of other phases to form a neutral point;
    an inter-phase distance ensuring member that, in a slot among the plurality of slots in which one phase coil directly connected to the power terminal and another phase coil directly connected to the neutral point are adjacently disposed, is disposed in a gap via which the two phase coils are adjacent; and
    a temperature sensor that is inserted in an insertion hole provided in the inter-phase distance ensuring member.

2. The stator of a rotary electric machine according to claim 1, wherein:
    the insertion hole is provided in the inter-phase distance ensuring member in an axial direction of the stator from the side of a coil end of the stator of the rotary electric machine; and
    the temperature sensor is fixed in the insertion hole of the inter-phase distance ensuring member.

3. The stator of a rotary electric machine according to claim 1, wherein the inter-phase distance ensuring member is formed by electrically insulative material.

* * * * *